United States Patent [19]

Onishi

[11] 3,764,988

[45] Oct. 9, 1973

[54] INSTRUCTION PROCESSING DEVICE USING ADVANCED CONTROL SYSTEM

[75] Inventor: Yoshihiro Onishi, Kokubunji, Japan

[73] Assignee: Hitachi, Ltd., Tokyo, Japan

[22] Filed: Mar. 1, 1972

[21] Appl. No.: 230,913

[30] Foreign Application Priority Data

Mar. 1, 1971 Japan .................................. 46/9961

[52] U.S. Cl. ............................................. 340/172.5

[51] Int. Cl. ............................................. G06f 9/20

[58] Field of Search .................................. 340/172.5

[56] References Cited

UNITED STATES PATENTS

| | | | |
|---|---|---|---|
| 3,614,747 | 10/1971 | Ishihara | 340/172.5 |
| 3,629,853 | 12/1971 | Newton | 340/172.5 |
| 3,408,630 | 10/1968 | Packard | 340/172.5 |
| 3,551,895 | 12/1970 | Driscoll | 340/172.5 |
| 3,573,853 | 4/1971 | Watson | 340/172.5 |
| 3,577,189 | 5/1971 | Cocke | 340/172.5 |

*Primary Examiner*—Paul J. Henon
*Assistant Examiner*—Sydney R. Chirlin
*Attorney*—Paul M. Craig, Jr. et al.

[57] ABSTRACT

An instruction processing device employs an advanced control system which has a first decoder for decoding, in sequence, ordinary instructions except branch instructions and a second decoder, additional to the first decoder, for discriminating branch instructions. When the second decoder discriminates a branch instruction, the contents of the discriminated branch instruction are preferentially address-modified and thus the instruction to which the branch is made is read out.

22 Claims, 5 Drawing Figures

INSTRUCTION PROCESSING DEVICE USING ADVANCED CONTROL SYSTEM

BACKGROUND OF THE INVENTION

1. Field of the Invention

This invention relates to a central processing device of an electronic computer, electronic exchanger and the like, and more particularly to an instruction processing device using an advanced control system.

2. Description of the Prior Art

An aim of an advanced control system employed in a computer for reading out and processing the instructions of its stored program is to increase computer processing efficiency. In this system, while one instruction is being processed, the next instruction is read out from memory and, if the instruction read-out requires that information is to be read out from the memory, such information is additionally read out therefrom to prepare for processing a subsequent instruction, thus making the computer operable at a higher efficiency.

In a conventional instruction processing method, the instructions read out from the memory are decoded and address-modified in sequence and no special consideration is given to branch instructions to be processed preferentially. Namely, a branch instruction cannot be decoded and address-modified unless its turn comes around. Therefore, a considerable length of time is required before decoding the instruction to which the branch is made. As a result branch instruction processing has been slow in the prior art.

Even up-to-date electronic computers operable at a high speed in processing general operation instructions are slow in dealing with branch instructions, in spite of the fact that a computer is supposed to process branch instructions at a rate of 25 to 35 percent of its total instruction processing. This problem has made it difficult to improve the overall efficiency of a computer system.

SUMMARY OF THE INVENTION

A principal object of this invention is to provide an instruction processing device capable of processing instructions at a high speed.

Another object of this invention is to provide a device capable of high speed instruction processing in an advanced control system.

Another object of this invention is to provide a device operable at an incomparably high speed in processing branch instructions.

Briefly, the invention has for its objects the provision of a unit operated for discriminating branch instructions and supplying the discriminated results to the subsequent processing unit.

DETAILED DESCRIPTION OF THE INVENTION

Figure 1:
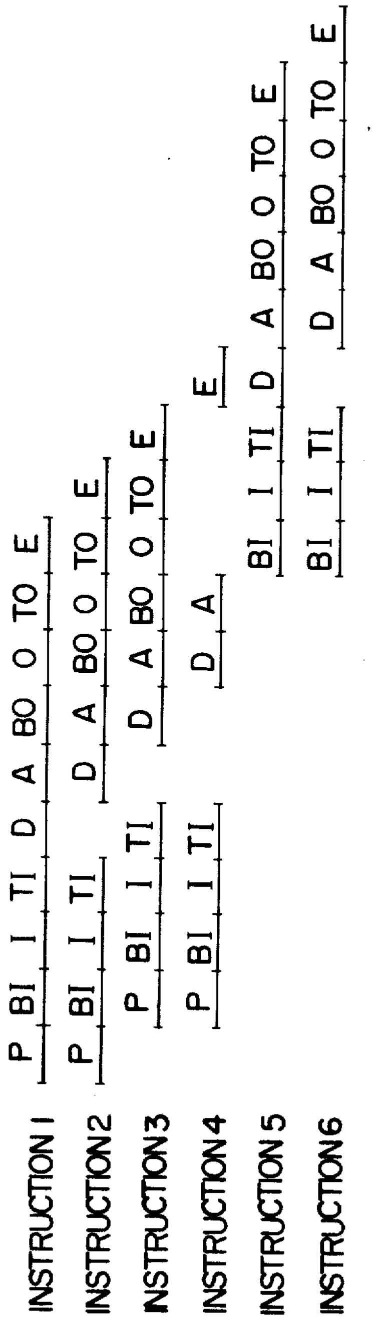
FIG. 1 PRIOR ART
FIG. 1 is a time chart showing an example of an instruction processing cycle employed in the prior art.

Referring to FIG. 1, there is shown a prior art example of an instruction processing cycle.

In FIG. 1, each alphabetical code indicates one cycle, with functions as follows.

P : preparation for a read-out instruction, for example, renewal of a program counter;

BI : collation whether instructions are in the buffer memory;

I : reading out instruction from the buffer memory;

TI : transferring the read-out instruction to an instruction buffer register;

D : instruction decoding;

A : arithmetic operation on the address of the instruction;

BO : collation whether there is an operand in the buffer memory;

O : reading out operand from the buffer memory;

TO : transferring the read-out operand to the operand buffer register; and

E : arithmetic operation.

In this time chart, it is assumed that only the instruction 4 is the branch instruction, and the other instructions 1, 2, 3, 5 and 6 are ordinary instructions (such as an addition instruction) for read-out of an operand and execution of arithmetic operations.

It is also assumed that all the instructions and operands are in the buffer memory, and two instructions are read out from the buffer memory at the same time.

It is to be noted that the time chart in FIG. 1 is only an example; the contents of the processing cycle and the cycle time differ by the kind of device and the kind of instructions used. The aim of this time chart is to show several basic processing cycles.

Figure 2:
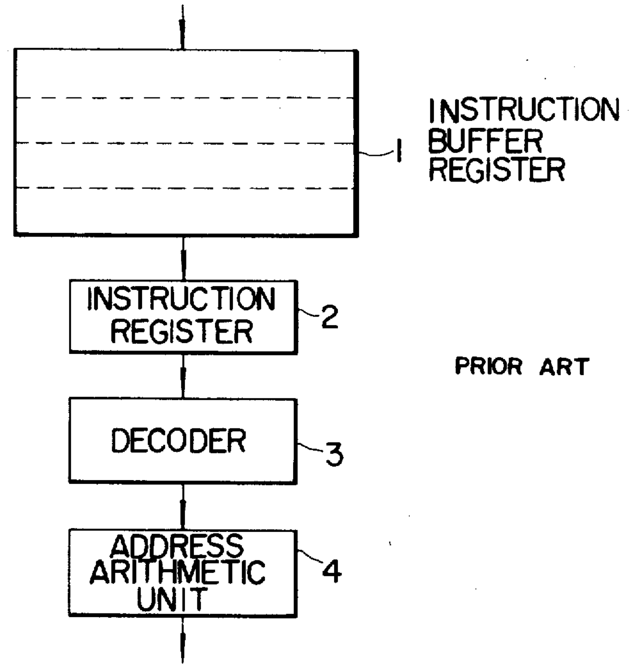
FIG. 2 is a block diagram showing a conventional instruction processing device.

FIG. 2 shows in block form a part of a conventional instruction processing device which executes the processing cycles shown in the time chart in FIG. 1. In this device, the cycles TI, D and A are processed.

Referring to FIG. 2, the instructions supplied from the memory such as a buffer memory (not shown diagramatically) are stored temporarily in the instruction buffer register 1. These instructions are transferred in sequence to the instruction register 2, decoded in the decoder 3, and sent to the address arithmetic unit 4, in which the instructions are address-modified.

From the time chart (FIG. 1) and the block diagram (FIG. 2) it is apparent that the cycle D for transferring the instruction to the instruction register 2 and decoding it in the decoder 3 is executed, instruction by instruction, in a time sequence.

Similar to the preceding instructions, the instruction 4 (a branch instruction) is decoded in the decoder 3 according to the sequence. In other words, the instruction 4 cannot be discriminated to be a branch instruction until its turn comes around. This branch instruction is then address-modified, and the instructions 5 and 6 to which the branch is made are read out. As a consequence, a considerable length of time is required before decoding the instructions 5 and 6, thus slowing down the branch instruction processing.

Figure 3:
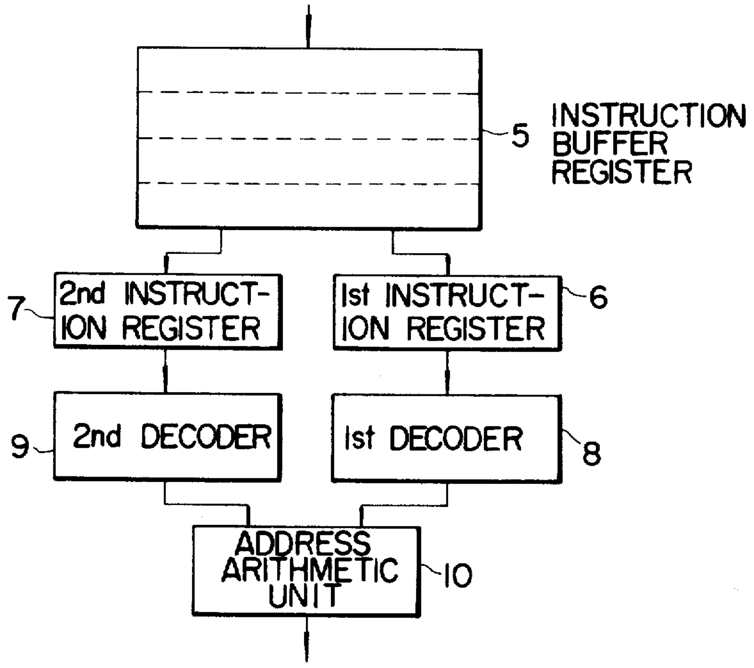
FIG. 3 is a block diagram showing an instruction processing device embodying this invention.

Referring to FIG. 3, there is shown in block form an instruction processing device of this invention wherein the numeral reference 5 denotes an instruction buffer register, and 6 and 7 a first and a second instruction register respectively. The reference numeral 8 indicates a first decoder for decoding oridinary instructions excepting branch instructions, 9 a second decoder for discriminating the branch instruction, and 10 an address arithmetic unit.

The instruction buffer register 5, the first instruction register 6, the first decoder 8, and the address arithmetic unit 10 in FIG. 3 correspond to the prior art instruction buffer register 1, instruction register 2, decoder 3, and address arithmetic unit 4 in FIG. 2. The second instruction register 7 and decoder 9 are the additional elements provided according to this invention.

This novel instruction processing device is operated in the following manner. The instructions read-out from the buffer memory are stored in the instruction buffer register 5 until the individual decoding sequences appear.

An instruction appearing in turn is inserted into the first instruction register 6 and then transferred to the first decoder 8. In the decoder 8, the instructions other than the branch instruction are decoded, and their contents are supplied to the address arithmetic unit 10.

At the same time an instruction in turn is inserted into the second instruction register 7, independent of the insertion and processing of the instruction inserted into the first instruction register 6 and decoded by the decoder 8. The second decoder 9 discriminates whether the instruction inserted in the second instruction register 7 is a branch instruction.

Immediately when the instruction is discriminated to not be a branch instruction, the next instruction is inserted into the instruction register 7 from the buffer register 5.

In this manner only branch instructions are examined from among other instructions one after another. When a branch instruction is detected, necessary processing is executed, and the contents of the branch instruction are sent to the address arithmetic unit 10, in which the instruction is address-modified. The instruction to which the branch is made is read out according to the modified result.

The time required for the decoder 9 to discriminate a branch instruction from others is sufficiently short so that all the instructions stored in the instruction buffer register 5 can be evaluated within one cycle.

In other words, according to this invention, a branch instruction can be accurately evaluated and decoded within the period of one cycle, or the branch instruction can be picked up and decoded in far shorter time than by the conventional processing wherein the instructions are sequentially read out and decoded cycle by cycle.

Figure 4:
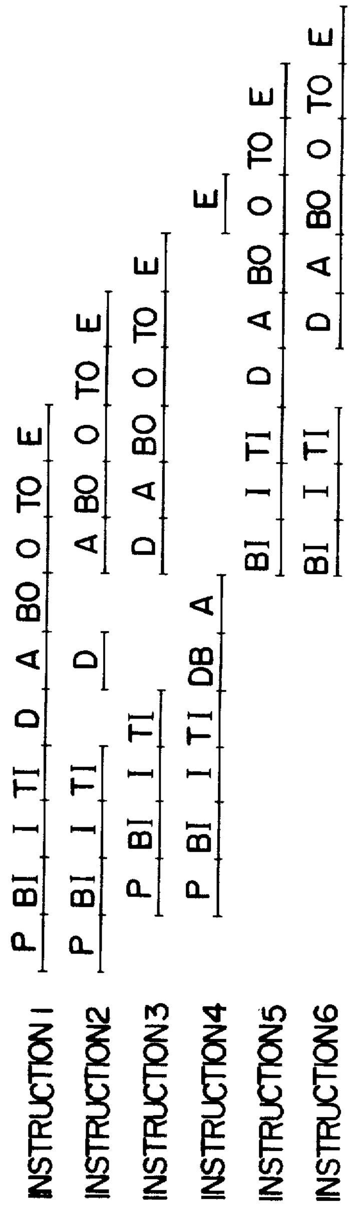
FIG. 4 is a time chart showing an example of an instruction processing cycle according to this invention.

FIG. 4 is a time chart showing how instructions are processed according to this invention. The cycles indicated by the identical codes as in FIG. 1 are functionally the same as those in FIG. 1.

In FIG. 4, the cycle DB is for discriminating the branch instruction from the instructions stored in the instruction buffer register 5. Within this cycle DB, all the instructions stored therein are evaluated if the branch instruction is present.

As illustrated in FIG. 4, a branch instruction 4, if present, is discriminated in the cycle DB, and address-modified in the next cycle A. Following this operation, the processing device starts reading out the instructions 5 and 6 to which the branch is made.

The cycle A of the branch instruction 4 is preferentially executed. During this execution, the cycle A of the instruction 2 is maintained in a hold condition.

From the time chart in FIG. 4 in comparison with that in FIG. 1, it is apparent that the execution of branch instruction decoding is faster by 2 cycle periods. This means that the instructions to which the branch is made can be processed at a greater efficiency than in the prior art.

Figure 5:
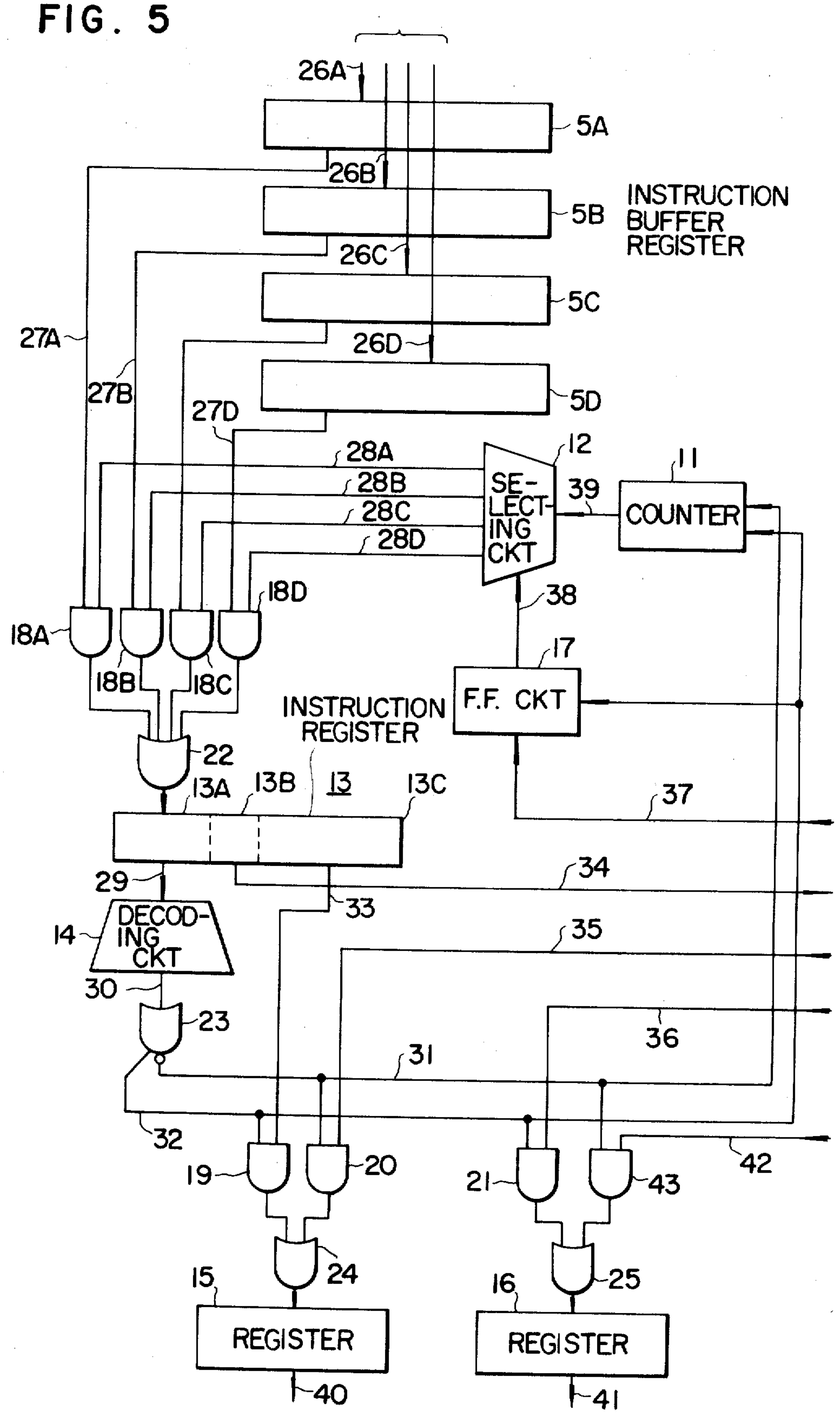
FIG. 5 is a circuit diagram showing in concrete form a portion of the device shown in FIG. 3.

FIG. 5 is a circuit diagram showing in concrete form a portion of the instruction processing device shown in FIG. 3.

In FIG. 5, the references 5A, 5B, 5C and 5D denote instruction buffer registers (corresponding to 5 in FIG. 3) for temporarily storing the instructions transferred from memory such as a buffer memory (not shown diagrammatically). The numeral 11 denotes a counter for indicating one of the instruction buffer registers 5A, 5B, 5C and 5D from which the next instruction is read out, and 12 is selecting circuit for decoding the contents of the counter 11 and selecting one of the instruction buffer registers 5A, 5B, 5C and 5D. The numeral 13 indicates an instruction register (corresponding to the second instruction register 7 in FIG. 3) to which the instruction is transferred from the instruction buffer register 5A, 5B, 5C or 5D. 13A is the field for the instruction operation code, 13B for the number of the index register, and 13C for the address of an operand. The numeral 14 represents a decoding circuit for decoding the operation code 13A of the instruction register 13 and thus discriminating the branch instruction. (This decoder corresponds to the second decoder 9 in FIG. 3). The numeral 15 denotes a register for registering the operand address, 16 a register for registering the address of an index register, 17 a flip-flop indicating that a branch instruction is being processed, 18 through 21 and 43 AND circuits, and 22 through 25 OR circuits.

The references 26A, 26B, 26C and 26D denote transfer lines for transferring instructions from the memory unit to the instruction buffer registers 5A, 5B, 5C and 5D respectively, 27A, 27B, 27C and 27D transfer lines for transferring instructions to the instruction register 13 from the instruction buffer registers 5A, 5B, 5C and 5D respectively, 28A, 28B, 28C and 28D selection lines for selecting the transfer line 27A, 27B, 27C or 27D according to the indication from the selection circuit 12, 29 a transfer line for transferring the operation code 13A of the instruction register 13 to the decoder circuit 14, 31 an output line carrying an output when the decoder 14 determines that the presented instruction is not a branch instruction, 32 an output line carrying an output when the decoder determines that the presented instruction is a branch instruction, 33 a transfer line for transferring the operand address field 13C of the instruction register 13 to the register 15, 34 a transfer line for transferring the index register number 13B of the instruction register to the index register group (not shown diagrammatically), 35 a transfer line for transferring the operand address of the first instruction register 6 (FIG. 3), 36 a transfer line for transferring the address of the index register designated by the index register number 13B, 37 a signal line indicating that the condition of the branch instruction has been established, 38 an output line for setting the flip-flop 17, 39 an output line of the counter 11, 40 and 41 output lines of the registers 15 and 16 respectively, and 42 a transfer line for transferring the address of the index register selected according to the index register number of the first instruction register 6 (FIG. 3).

This instruction processing device is operated in the following manner. The instructions read out from the memory are transferred through the transfer lines 26A, 26B, 26C and 26D and stored in the instruction buffer registers %a, 5B, 5C and 5D respectively.

The number corresponding to the instruction to be read out from the instruction buffer register 5A, 5B, 5C or 5D is stored in the counter 11. The contents of this counter are supplied to the selecting circuit 12 by way of the output line 39. In the selecting circuit 12, one of the selection lines 28A, 28B, 28C and 28D, which corresponds to the instruction buffer register number, is selected, and a "1" signal is transmitted over the selected line. This "1" signal is applied to the AND circuit 18A, 18B, 18C or 18D, which corresponds to the selected line. The instruction transferred from the instruction buffer register 5A, 5B,5C or 5D is sent out over the transfer line 27A, 27B , 27C or 27D , which corresponds to the AND circuit to which the "1" signal was applied. This instruction is received by the instruction register 13 via the AND circuit 18A, 18B , 18C or 18D and via the OR circuit 22. The instruction register 13 consists of memory fields 13A, 13B and 13C. The operation code of the instruction stored in the field 13A is sent to the decoding circuit 14 through the transfer line 29. The decoding circuit 14 determines or judges whether the given instruction is a branch instruction or not. The result is sent out over the output line 30. The decoding circuit 14 can be constituted of a simple, known logic circuit. A "1" signal is sent out over the output line 30 when the instruction is a branch instruction. A "0" signal is sent out over the output line 30 when the determination does not result in a branch instruction. The signal on the output line 30 is supplied to the OR circuit 23. When the determination does not result in a branch instruction, the OR circuit 23 delivers an inverted output, i.e., a "1" signal to the output line 31. When it is a branch instruction, a "1" signal is sent out over the output line 32.

If the operation code 13A of the instruction register 13 is discriminated to be a branch instruction in the decoding circuit 14, the output line 32 carries a "1" signal. This "1" signal is applied to the AND circuit 19, and the operand address in the field 13C of the register 13 is transferred to the register 15 through the transfer line 33, AND circuit 19 and OR circuit 24.

The index register number in the field 13B of the instruction register 13 is sent to the index register group (not shown diagrammatically, through the transfer line 34. One of the index registers corresponding to the given register number is selected, and the address of this index register is returned over the transfer line 36.

At the same time, a "1" signal is applied to the AND circuit 21 by way of the output line 32, and the index register address on the transfer line 36 is stored in the register 16 via the AND circuit 21 and OR circuit 25.

The operand address and the index address stored in the registers 15 and 16 are supplied to the address arithmetic unit by way of the output lines 40 and 41, respectively. Then the two addresses undergo address modification.

When the decoding circuit 14 determines that the operation code 13A of the instruction register 13 is not a branch instruction, a "1" signal is sent out over the output line 31, thereby advancing the contents of the counter 11 by one, and the next instruction is selected in the foregoing manner. These operations continue until a branch instruction is discriminated.

Via the output line 31, a "1" signal is applied to the AND circuits 20 and 43, and the operand address and the index address of the instruction stored in the first instruction register are transferred to the registers 15 and 16, respectively, by way of the transfer lines 35 and 42, AND gate 20- OR gate 24 and AND gate 43 - OR gate 25.

Thus, when the decoder evaluation results in a branch instruction, address modification is executed on the branch instruction; when the decoder evaluation does not result in a branch instruction, address modication is executed on other instructions.

Via a "1" signal on the output line 32, flip-flop 17 is set, the set output is applied to the selection circuit 12 via the output line 38, and all the outputs of the selection circuit 12 become "0" signals. After the condition of branch instruction is established, the flip-flop 17 is reset.

In other words, processing of the subsequent branch instruction is inhibited until a branch condition is established after the first branch instruction has been discriminated.

By a "1" signal on the output line 32, the contents of the counter 11 are set to the necessary initial value. After establishment of a branch condition, the selection circuit 12 starts the aforementioned selection operation from the number corresponding to the initial value.

The AND circuits 18A, 18B, 18C and 18D described above are only one bit gates for explanatory simplicity. Practically, however, these AND circuits must be provided to correspond to the number of bits of the instruction register 13. Similarly, the AND circuits 19 through 21 and 43 must correspond to the number of bits of the registers 15 and 16.

According to this invention, as has been described above, a unit operated only for discriminating and processing a branch instruction is used in addition to the conventional unit and, thus, the invention enables an electronic computer to expedite its branch instruction processing and increase overall system efficiency.

What I claim is:

1. An instruction processing device employing an advanced control system, comprising:

instruction buffer means for storing instructions read out from a memory;

decoding means for decoding in sequence said instructions except a branch instruction;

judging means for judging whether any one of said instructions is a branch instruction;

address arithmetic means for address-modifying the contents of said instructions; and transfer means for preferentially transferring the contents of an instruction judged as a branch instruction to said address arithmetic means.

2. An instruction processing device employing an advanced control system, comprising:

an instruction buffer register for storing instructions read out from a memory;

first and second instruction registers for taking out said instructions stored in said instruction buffer register and for storing said taken out instructions;

an address arithmetic unit for address-modifying the contents of said instructions;

a first decoder for decoding the instructions stored in said first instruction register, except a branch instruction;

a second decoder for judging whether the instruction in said second instruction register is a branch instruction; and gate means for preferentially transferring the contents of an instruction to said address arithmetic unit when the instruction is judged to be a branch instruction by said second decoder.

3. An instruction processing device employing an advanced control system as defined in claim 2, in which said second decoder and said gate means comprise:

a decoder for judging from the operation code field of said instruction in said second instruction register whether such instruction is a branch instruction;

a gate for preferentially selecting both the operand address field of an instruction and the contents of the index register designated by this instruction when the instruction is judged to be a branch instruction by said decoder; and a register for holding and transferring the output of said gate to said address arithmetic unit.

4. An instruction processing device for a central processing portion of a computer having a memory unit which a plurality of instructions to be carried out are stored, said processing device comprising:

first means, coupled to the memory unit, for storing instructions read-out therefrom;

second means, coupled to said first means, for sequentially decoding all instructions except branch instructions supplied thereto from said first means;

third means, coupled to said first means, for detecting the existence of a branch instruction among instructions supplied thereto from said first means;

fourth means, coupled to said second and third means, for address-modifying the contents of instructions supplied therefrom; and fifth means, responsive to the detection of the existence of a branch instruction by said third means, for preferentially transferring the contents of said branch instruction to said fourth means, to be address-modified thereby, whereby processing of the contents of branch instructions included among a plurality of instructions in memory will be expedited.

5. An instruction processing device according to claim 4, wherein said first means comprises at least one instruction buffer register coupled to said memory unit for storing instructions from said memory unit, and further including first and second instruction registers coupling the instructions from said first means to said second and third means, respectively, by temporarily storing instructions from said at least one instruction buffer register prior to effecting a transfer of the contents of the instructions to said second and third means.

6. An instruction processing device according to claim 5, wherein said third means comprises a decoding circuit, responsive to the contents of an instruction stored in said second instruction register, for providing an output signal representative of whether the contents of the instruction temporarily stored in said second instruction register correspond to a branch instruction.

7. An instruction processing device according to claim 6, wherein said fifth means comprises a first gating circuit, responsive to the outputs of said decoding circuit and said second instruction register, for transferring the contents of the instruction temporarily stored in said second instruction register and detected to be a branch instruction to said fourth means.

8. An instruction processing device according to claim 6, wherein said third means further comprises means, responsive to the output of said decoding circuit and being coupled to said buffer register, for effecting the transfer of a new instruction from said buffer register into said second instruction register, when the output signal of said decoding circuit indicates that the instruction temporarily stored in said second instruction register is an instruction other than a branch instruction.

9. An instruction processing device according to claim 6, wherein said third means further comprises means, responsive to the output of said decoding circuit and being coupled to said buffer register, for preventing the transfer of a new instruction from said buffer register into said second instruction register, when the output signal of said decoding circuit indicates that the instruction temporarily stored in said second instruction register is a branch instruction.

10. An instruction processing device according to claim 8, wherein said third means further comprises means, responsive to the output of said decoding circuit and being to said buffer register, for preventing the transfer of a new instruction from said buffer register into said second instruction register, when the output signal of said decoding circuit indicates that the instruction temporarily stored in said second instruction register is a branch instruction.

11. An instruction processing device according to claim 7, wherein said fifth means further comprises a second gating circuit, responsive to the outputs of said decoding circuit and said first instruction register, for transferring the contents of the instruction temporarily stored in said first instruction register to said address arithmetic unit, when the output of said decoding circuit indicates that the instruction temporarily stored in said second instruction register is an instruction other than a branch instruction.

12. An instruction processing device according to claim 11, wherein said fourth means comprises an address arithmetic unit in which the contents of instructions delivered thereto are address-modified.

13. An instruction processing device according to claim 11, wherein said fifth means further includes an operand address register and an index register, each of which is respectively coupled to the operand and index portions of each of said first and second instruction registers via said first and second gating circuits, for storing the operand and index addresses of instructions transferred to said address arithmetic unit.

14. An instruction processing device according to claim 10, further including an input gating circuit connected between the output of said at least one buffer register and the input to said second instruction register for gating the contents of said buffer register into said instruction register.

15. An instruction processing device according to claim 14, wherein said means for effecting the transfer of a new instruction into said second register comprises means, coupled to the input of said input gating circuit, for effecting the passage therethrough, of the contents of said buffer register.

16. An instruction processing device according to claim 15, wherein said transfer preventing means comprises means, coupled to the input of said input gating circuit, for inhibiting the passage therethrough, of the contents of said buffer register.

17. An instruction processing device according to claim 16, wherein said passage effecting and inhibiting means comprises a flip-flop coupled to the output of said decoding circuit and to said input gating means for providing a first bistable output when the output of said decoder circuit indicates that the contents of said second instruction register correspond to a branch instruction and for providing a second bistable condition when the output of said decoder circuit indicates that the contents of said second instruction register correspond to an instruction other than a branch instruction, said bistable outputs being coupled to said input gating means.

18. An instruction processing device according to claim 17, wherein said at least one buffer register includes a plurality of buffer registers, and wherein said passage effecting and inhibiting means further includes a counter circuit coupled to the output of said decoder circuit, and a selecting circuit responsive to the outputs of said flip-flop and said counter circuit for controlling the gating of the contents of a selected one of said plurality of buffer registers into said second instruction register.

19. An instruction processing device according to claim 18, wherein said fifth means comprises a first gating circuit, responsive to the outputs of said decoding circuit and said second instruction register, for transferring the contents of the instruction temporarily stored in said second instruction register and detected to be a branch instruction to said fourth means.

20. An instruction processing device according to claim 19, wherein said fifth means further comprises a second gating circuit, responsive to the outputs of said decoding circuit and said first instruction register, for transferring the contents of the instruction temporarily stored in said first instruction register to said address arithmetic unit, when the output of said decoding circuit indicates that the instruction temporarily stored in said second instruction register is an instruction other than a branch instruction.

21. An instruction processing device according to claim 20, wherein said fourth means comprises an address arithmetic unit in which the contents of instructions delivered thereto are address-modified.

22. An instruction processing device according to claim 21, wherein said fifth means further includes an operand address register and an index register, each of which is respectively coupled to the operand and index portions of each of said first and second instruction registers via said first and second gating circuits, for storing the operand and index addresses of instructions transferred to said address arithmetic unit.

* * * * *